Patented July 18, 1933

1,918,361

UNITED STATES PATENT OFFICE

ANDERS RUTGER WIBERG AND PER MAGNUS EDVARD SCHÖN, OF HALSINGBORG, SWEDEN, ASSIGNORS TO REYMERSHOLMS GAMLA INDUSTRI AKTIEBOLAG, A JOINT-STOCK COMPANY, OF HALSINGBORG, SWEDEN

METHOD OF MANUFACTURING SILICATES WITH BASE EXCHANGING PROPERTIES, OR SO-CALLED ARTIFICIAL ZEOLITES

No Drawing. Application filed June 5, 1929, Serial No. 368,732, and in Sweden June 6, 1928.

Iron-aluminium silicates of different kinds met with in nature, such as kaolin, bauxite and other more or less refractory clays are altogether deficient in or only in a small degree in possession of the base exchanging properties characteristic of other silicates met with in nature, such as zeolites and similar silicates.

The present invention refers to a method of manufacturing so-called artificial zeolites out of natural silicates, such as kaolin, bauxite and other similar iron-aluminium silicates and more or less refractory clays by treating the same with acids and/or acid alkali salts, so that the silicate is decomposed, whereupon the residue remaining upon filtration, the so-called waste clay, consisting substantially of silicic acid and iron- and aluminium oxides insoluble in acid, is boiled under pressure with the oxides, hydroxides or carbonates of the alkali metals and/or of the alkaline earth metals, either each per se, or in a mixture.

If a silicate of the above-mentioned type, after suitable preparation is treated with a mineral acid, such as sulphuric acid, hydrochloric acid, or nitric acid, as is previously known for instance from the manufacture of aluminium salts therefrom in an open vessel or under pressure, the original silicate is decomposed, a solution of the aluminium salt corresponding to the acid employed being then obtained upon filtration, the said aluminium salt being contaminated with greater or smaller quantities of corresponding iron salts (ferrous or ferric compounds) according to the nature of the clay employed; in addition to the said solution a residue consisting of silicic acid and oxides of aluminium and iron insoluble in acids is also obtained. For the digestion stated, it is also possible in known manner, and with about the same results, to make use of the acid alkali salts of the corresponding acids either alone or if desired together with acids. The above mentioned residue (hereinafter termed "waste clay") has no more real base exchanging properties than the original clay (see Chemiker-Zeitung No. 28, page 355, of the year 1907), besides which the waste clay is hardly suitable as a filtering material owing to its mucous consistency and its impermeable properties toward liquids in consequence thereof.

However, if this waste clay, which is worthless in itself, is treated with oxides, hydroxides or carbonates of alkali metals and/or alkaline earth metals by boiling under pressure, a silicate is obtained of a porous, pumiceous structure having strong base exchanging properties, and which silicate is at the same time very permeable toward liquids, by reason of its pronounced porosity, and consequently very suitable as a filtering material.

It has been found that the silicate thus obtained has a base exchanging ability corresponding to 2500–3000 milligrams CaO per 100 grams of silicate, and thus constitutes an artificial zeolite having a base exchanging power exceeding considerably what has been obtained hitherto in artificial zeolites or permutites manufactured in other ways.

Moreover, by boiling the waste clay in the manner above indicated with oxides, hydroxides or carbonates of the alkali metals and/or of the alkaline earth metals hydration of the silicate is obtained directly, which hydration is a condition for the base exchanging properties thereof.

An embodiment of the invention will be described more fully in the following, but it should be observed that the example set forth is not the only one according to which the invention may be carried into effect, it being possible to modify the methods in various ways, without departing from the spirit or the scope of the claims.

A clay composed as follows, for instance: $Al_2O_3$ 32%, $Fe_2O_3$ 3%, $SiO_2$ 45%, loss on ignition 20%, is roasted at a suitable temperature of about 700 degrees centigrade, whereupon the composition of the clay will be about as follows: $Al_2O_3$ 41%, $FeO_2O_3$ 3.5%, $SiO_2$ 54%, loss on ignition 2%. Upon fine-grinding this roasted clay is treated with a certain quantity of sulphuric acid, for instance 135 kilograms of sulphuric acid of a specific gravity of 1.53, diluted by a suitable quantity of water per 100 kilograms of roasted clay, either in an open vessel or under pressure. After the decomposing process has been completed, the aluminium sulphate solution is filtered off, for instance in a filter press, and the waste clay obtained is washed out. This waste clay is then of about the following composition: dry test, $Al_2O_3$ 14%, $Fe_2O_3$ 1.50%, $SiO_2$ 75%, loss on ignition 10%.

The waste is then mixed with a calculated quantity of lime-water or with a corresponding quantity of lime-water and alkali metal oxide, alkali metal hydroxide or alkali metal carbonate, whereupon the mixture is boiled under a pressure of 8–12 atmospheres, for example. During the boiling, the lime or the lime and the alkali metal respectively combine with the waste clay while forming a very porous, pumiceous calcium-(calcium-alkali metal) aluminium hydro-silicate highly permeable toward liquids and having a comparatively high degree of hardness and a very strong base exchanging power. As set forth hereinbefore, the necessary hydration of the silicate, which is often difficult to effect in other previously known methods of manufactluring zeolite, also takes place during the boiling, which circumstance involves a considerable technical improvement.

The artificial zeolite obtained in the manner hereinbefore described is broken up into pieces of a suitable size, and is washed, for instance with a solution of sodium chloride, until it is free from lime, and is then ready to absorb, for instance, lime and so forth out of water.

According to trials made it has been found that an artificial zeolite produced in the manner hereinbefore set forth has a base exchanging ability of 2500–3000 milligrams CaO per 100 grams of artificial zeolite, whereas by other methods as hitherto practised for the manufacture of artificial zeolites a maximum output of 1500–2000 milligrams CaO per 100 grams of zeolite has been obtained, and with natural zeolites and natrolites an output of only 200–600 milligrams CaO per 100 grams of mass.

The same result is also attained by boiling the waste clay with caustic soda; soda ash or other alkali. It has been found, however, that the presence of lime in the boiling process aids in a particularly high degree in the formation of a porous material of suitable hardness.

Artificial zeolites with base exchanging properties are also obtained by fusing or sintering the waste clay with oxides, hydroxides and carbonates of the alkali metals and/or of the alkaline earth metals and by subsequent hydration of the mass thus treated.

Obviously, it is possible by this method to produce compounds with base exchanging properties by treating clays, which are not suitable for the manufacture of aluminium salts, in a similar manner.

The main object of the treatment with acid will be the same, i. e. to decompose the original silicates by the digestion with acid, and to facilitate, by dissolving the oxides, for instance of iron and aluminium, by means of acid, the introduction of the oxides and the hydroxides of the alkali metals and/or of the alkaline earth metals in the residue of the original acid-treated silicate, consisting substantially of silica and of oxides of iron and aluminium insoluble in acids.

Zeolites produced in the manner hereinbefore described are by reason of their pronounced base exchanging ability and by reason of their porosity very suitable for all known purposes for which natural and artificial zeolites have come into use, for instance for the removal of lime, magnesium, iron and manganese out of water, and to serve as carriers of contact substances, and so forth.

In the appended claims the term "basic oxygen compound of an alkali-forming metal" is used to mean the oxides, hydroxides and carbonates of the alkali- and alkaline-earth metals.

What we claim is:—

1. Method of manufacturing artificial zeolites characterized in that waste clay obtained in the manufacture of aluminium salts by decomposition of a substance of the group consisting of natural aluminium silicates, bauxite and refractory clays by means of a strong acidic compound, is boiled under pressure in an aqueous mixture containing at least one basic oxygen compound of an alkali-forming metal.

2. Method of manufacturing artificial zeolites, characterized in that waste clay obtained in the manufacture of aluminium salts by decomposition of a substance of the group consisting of natural aluminum silicates, bauxite and refractory clays by means of a strong mineral acid, is boiled under pressure in an aqueous mixture containing lime and the zeolite so produced is subsequently washed with an alkali metal salt until it is free from lime.

3. Method of manufacturing artificial zeolites, characterized in that waste clay obtained in the manufacture of aluminium salts by decomposition of a substance of the group consisting of natural aluminium silicates, bauxite and refractory clays by means of a strong mineral acid, is boiled under pressure in an aqueous mixture containing lime and at least one more basic oxygen compound of an alkali-forming metal and the zeolite so produced is subsequently washed with an alkali metal salt until it is free from lime.

ANDERS RUTGER WIBERG.
PER MAGNUS EDVARD SCHÖN.